(12) United States Patent
Fang et al.

(10) Patent No.: US 12,083,625 B2
(45) Date of Patent: Sep. 10, 2024

(54) LASER SURFACE TREATMENT ON STAINLESS STEEL AND NICKEL ALLOYS FOR ADHESIVE BONDING

(71) Applicant: UNITED TECHNOLOGIES CORPORATION, Farmington, CT (US)

(72) Inventors: Xiaomei Fang, Glastonbury, CT (US); Christopher J. Hertel, Wethersfield, CT (US); John D. Riehl, Hebron, CT (US); John W. Connell, Yorktown, VA (US); Frank L. Palmieri, Yorktown, VA (US); John W. Hopkins, Suffolk, VA (US)

(73) Assignees: RTX Corporation, Farmington, CT (US); USA as Represented by the Administrator of the National Aeronautics and Space Administration, Washington, DC (US)

( * ) Notice: Subject to any disclaimer, the term of this patent is extended or adjusted under 35 U.S.C. 154(b) by 414 days.

(21) Appl. No.: 16/839,753

(22) Filed: Apr. 3, 2020

(65) Prior Publication Data
US 2020/0316721 A1    Oct. 8, 2020

Related U.S. Application Data

(60) Provisional application No. 62/830,026, filed on Apr. 5, 2019.

(51) Int. Cl.
*B23K 26/359* (2014.01)
*B23K 26/0622* (2014.01)
*B23K 103/04* (2006.01)

(52) U.S. Cl.
CPC ........ *B23K 26/359* (2015.10); *B23K 26/0622* (2015.10); *B23K 2103/05* (2018.08)

(58) Field of Classification Search
CPC ............ B23K 26/0622; B23K 2103/05; B23K 26/359; B23K 26/3584; F16B 11/006
See application file for complete search history.

(56) References Cited

U.S. PATENT DOCUMENTS

| 4,861,407 A | 8/1989 | Volkmann et al. |
| 5,383,985 A | 1/1995 | Coulon |

(Continued)

FOREIGN PATENT DOCUMENTS

| CN | 101613860 | 12/2009 |
| JP | 2016124024 | 7/2016 |

(Continued)

OTHER PUBLICATIONS

Xiaomei Fang, et al., U.S. Appl. No. 16/253,958, filed Jan. 22, 2019 and entitled "Method for Adhesive Bonding of Titanium Components Using a Fiber Laser System", 22 pages.

(Continued)

*Primary Examiner* — Janie M Loeppke
*Assistant Examiner* — Abigail H Rhue
(74) *Attorney, Agent, or Firm* — Snell & Wilmer L.L.P.

(57) ABSTRACT

Methods and systems for the laser surface treatment on stainless steel alloys and nickel alloys may include a computer may be programmed to set a laser path corresponding to a predetermined geometric pattern. A laser may be coupled to the computer and apply a pulsed laser beam to a contact surface of the substrate along the predefined geometric pattern. The pulsed laser beam may have a laser power between 0.1 W and 100 W, single pulse fluence 1 mJ/mm$^2$ and 1025 mJ/mm$^2$ and a laser speed between 25.4 cm/s and 127 cm/s. The laser may generate an open pore oxide layer on the contact surface of the substrate with a thickness of 0.1-1 μm, an open pore distance of 0.05-1 μm. The open pore oxide layer may have a topography corre- (Continued)

sponding to the predefined geometric pattern. The topography may contain open pore structures and promote adhesive bond performance.

6 Claims, 9 Drawing Sheets

(56) References Cited

U.S. PATENT DOCUMENTS

| | | | |
|---|---|---|---|
| 6,176,959 | B1 | 1/2001 | Clarke |
| 6,488,805 | B1 | 12/2002 | Sauer |
| 6,521,052 | B2 | 2/2003 | Park et al. |
| 8,221,822 | B2 | 7/2012 | Flanagan |
| 8,987,632 | B2 * | 3/2015 | Wohl, Jr. .............. B23K 26/354 219/121.69 |
| 9,458,728 | B2 | 10/2016 | Bruck et al. |
| 10,082,166 | B2 | 8/2018 | Sabau et al. |
| 10,105,544 | B2 | 10/2018 | Dadashian et al. |
| 11,292,084 | B2 * | 4/2022 | Henrottin ............... B23K 26/60 |
| 2003/0024915 | A1 * | 2/2003 | Clauer .................. C21D 10/005 219/121.85 |
| 2004/0217094 | A1 * | 11/2004 | Mannava ............. C21D 10/005 219/121.61 |
| 2007/0251072 | A1 * | 11/2007 | Beeson .................... B23P 6/007 29/402.09 |
| 2010/0296942 | A1 | 11/2010 | Jevons |
| 2011/0287227 | A1 * | 11/2011 | Moser ....................... C23C 8/02 428/164 |
| 2013/0197628 | A1 | 8/2013 | Barcikowski |
| 2015/0151339 | A1 | 6/2015 | Bruck |
| 2016/0121591 | A1 | 5/2016 | MacAdams |
| 2017/0072511 | A1 * | 3/2017 | DiGiovanni ........... B24D 18/00 |
| 2017/0210058 | A1 | 7/2017 | Nishikawa et al. |
| 2018/0056077 | A1 | 3/2018 | Dadashian |
| 2018/0147658 | A1 | 5/2018 | Shapiro |
| 2018/0179989 | A1 | 6/2018 | Wadsworth |
| 2019/0366481 | A1 | 12/2019 | Coulaud |
| 2020/0230742 | A1 | 7/2020 | Fang |

FOREIGN PATENT DOCUMENTS

| | | |
|---|---|---|
| WO | 2018134508 | 7/2018 |
| WO | 2018149574 | 8/2018 |

OTHER PUBLICATIONS

European Patent Office, European Partial Search Report dated Jul. 7, 2021 in Application No. 21162970.4.

Zimmermann, et al., "Improved Adhesion at Titanium Surfaces via Laser-Induced Surface Oxidation and Roughening", Materials Science and Engineering: A, vol. 558, Dec. 29, 2012 (Dec. 29, 2012), pp. 755-760, XP028938836, ISSN: 0921-5093, DOI: 10.1016/J.MSEA.2012.08.101.

European Patent Office, European Search Report dated Sep. 11, 2020 in Application No. 20153238.9.

USPTO, Non-Final Office Action dated Sep. 28, 2021 in U.S. Appl. No. 16/253,958.

European Patent Office, European Search Report dated Nov. 4, 2021 in Application No. 20153238.9.

USPTO, Restriction/Election Requirement dated Dec. 3, 2022 in U.S. Appl. No. 17/185,010.

USPTO, Final Office Action dated Jan. 26, 2022 in U.S. Appl. No. 16/253,958.

USPTO; Advisory Action dated Apr. 5, 2022 in U.S. Appl. No. 16/253,958.

USPTO, Non-Final Office Action dated May 4, 2022 in U.S. Appl. No. 16/253,958.

USPTO, Notice of Allowance dated Aug. 26, 2022 in U.S. Appl. No. 16/253,958.

Frank L. Palmieri et al, "Laser Ablative Surface Treatment for Enhanced Bonding of Ti—6Al—4V Alloy", ACS Applied materials and Interfaces, 5(4), 1254-1261, 2013.

Frank L. Palmieri et al, "Laser Surface Preparation of Ti—6Al—4V Adherends: Green Processing for Improved Bond Durability", SAMPE Spring 2012 Electronic Conference Proceedings, May 21-24, 2012.

Frank L. Palmieri et al, "Further Investigation Into the Use of Laser Surface Preparation of Ti—6al—4v Alloy for Adhesive Bonding", SAMPE Spring 2014 Electronic Conference Proceedings, May 2014.

H.T.X. Truong et al, "On the Use of Laser Ablation Treatment to Prepare Metal Surfaces for Co-Cured Hybrid Composite Laminates and the Influence of Temperature on Fracture Toughness of Hybrid Metal-PMC Interfaces", 17th International Conference on Experimental Mechanics (ICEM 17) Electronic Proceedings, Rhodes, Greece, Jul. 3-7, 2016.

USPTO; Non-Final Office Action dated Jun. 21, 2022 in U.S. Appl. No. 17/185,010.

USPTO, Notice of Allowance dated Dec. 13, 2022 in U.S. Appl. No. 17/185,010.

USPTO, Notice of Allowance dated Oct. 21, 2022 in U.S. Appl. No. 17/185,010.

USPTO, Non-Final Office Action dated Dec. 15, 2023 in U.S. Appl. No. 18/093,613.

USPTO; Final Office Action dated Apr. 8, 2024 in U.S. Appl. No. 18/093,613.

* cited by examiner

LASER SURFACE TREATMENT ON STAINLESS STEEL AND NICKEL ALLOYS FOR ADHESIVE BONDING

CROSS-REFERENCE TO RELATED APPLICATIONS

This application is a non-provisional patent application of, and claims priority to, U.S. Provisional Pat. App. No. 62/830,026 filed Apr. 5, 2020 and entitled "LASER SURFACE TREATMENT ON STAINLESS STEEL AND NICKEL ALLOYS FOR ADHESIVE BONDING," which is incorporated herein by reference in its entirety.

STATEMENT OF GOVERNMENT RIGHTS

The invention described herein was made in the performance of work under a NASA contract and by employees of the United States Government and is subject to the provisions of the National Aeronautics and Space Act, Public Law 111-314, § 3 (124 Stat. 3330, 51 U.S.C. Chapter 201) and 35 U.S.C. § 202, and may be manufactured and used by or for the Government for governmental purposes without the payment of any royalties thereon or therefore.

FIELD OF THE DISCLOSURE

The present disclosure relates to the laser surface treatment of stainless steel and nickel substrates for adhesive bonding.

BACKGROUND OF THE DISCLOSURE

Surface structures and surface chemistry on pre-bond metal substrates are important for adhesive bond performance and durability. An oxide layer with micro-level or nano-level open-pore structures is desirable to form strong bonding with aerospace-rated organic adhesives and/or primers. An oxide layer allows for the formation of chemical bond between metal substrate and organic adhesives/primers. High degree of open pore structures and increased micro-level roughness enhance the mechanical interlocking of adhesives/primers. Traditionally, abrasion, chemical etching and anodizing processes have been used as standard processes for metal substrates prior to bonding. However, bond quality from grit blast is often inconsistent, consequently risk in durability may become high. Etching and anodizing processes are wet chemistry batch processes and tend to use large quantities of hazard chemical solutions for immersion of entire parts. Current abrasion and chemical etching processes for stainless steel and nickel alloys have not been able to generate ideal surface properties to produce desirable failure modes for adhesively jointed structures.

SUMMARY OF THE DISCLOSURE

A method for surface treating a substrate prior to adhesive bonding is disclosed herein. The method may comprise determining, by a processor, a predetermined set laser path corresponding to a predefined geometric pattern; and commanding, by the processor, a laser to apply a pulsed laser beam to a contact surface of the substrate along the predefined geometric pattern, the pulsed laser beam having a single pulse fluence between 1 mJ/mm2 and 1025 mJ/mm2 with a surface topology having a height between 0.1 µm and 1 µm.

The method may further comprise, prior to the computer programming, coupling the laser to a computer numeric control (CNC) tool. The contact surface may comprise a complex three-dimensional geometry. The pulsed laser beam may be substantially normal to the contact surface during operation. The single pulse fluence may be between 10 mJ/mm2 and 205 mJ/mm2. The substrate may be a nickel alloy. The substrate may be a stainless steel alloy. The laser power may be between 0.1 W and 100 W with a single-pulse fluence between 1 mJ/mm$^2$ and 1025 mJ/mm$^2$, and wherein the laser speed is between 30 cm/s and 127 cm/s. The contact surface may be at least one of a portion of a pressure side surface, a portion of a suction side surface, or a portion of a leading edge surface. The predefined geometric pattern may comprise at least one of a linear array pattern, an overlapping linear array of lines, a perpendicular crosshatch pattern, or a rotating linear array. The pulsed laser beam may comprise a wavelength of about 1,064 nm or 355 nm.

A surface treating system is disclosed herein. The surface treating system may comprise a computer configured to define a predefined geometric pattern on a contact surface; and a laser coupled to the computer. The laser may be configured to provide a pulsed laser beam to the contact surface. The pulsed laser beam may have a diameter of about 10-100 µm, a laser power between 0.1 W and 100 W with a single-pulse fluence between 1 mJ/mm$^2$ and 1025 mJ/mm$^2$, and a laser speed between 2.54 cm/s and 254 cm/s. The laser may be configured to generate a porous oxide layer on the contact surface of the substrate. The porous oxide layer may have a topography corresponding to the predefined geometric pattern. The surface treatment system may further comprise a computer numeric control (CNC) tool. The CNC tool may be coupled to the laser and electrically coupled to the computer. The contact surface may be a complex three-dimensional surface. The substrate may be a nickel alloy. The substrate may be a stainless steel alloy.

A system for surface treating a blade is disclosed herein. The surface may comprise an airfoil having a contact surface; a computer configured to define a predefined geometric pattern on the contact surface; a computer numeric control (CNC) tool; and a laser coupled to the computer and the CNC tool. The CNC tool may be electrically coupled to the computer. The laser may be configured to provide a pulsed laser beam to the contact surface. The pulsed laser beam may have a diameter of about 10-µm, a laser power between 0.1 W and 100 W, and a laser speed between 25.4 cm/s and 127 cm/s. The laser may be configured to generate a porous oxide layer on the contact surface of the blade. The open pore oxide layer having a topography corresponding to the predefined geometric pattern.

The laser may be coaxial to the CNC tool. The contact surface may be at least one of a portion of a pressure side surface, a portion of a suction side surface, or a portion of a leading edge surface. The predefined geometric pattern may comprise at least one of a linear array pattern, a perpendicular crosshatch pattern, or a rotating linear array. The laser power may be between 0.1 W and 100 W with a single-pulse fluence between 1 mJ/mm$^2$ and 1025 mJ/mm$^2$, and wherein the laser speed is between 25.4 cm/s and 127 cm/s.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain the principles of the disclosure.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, electrical, and mechanical changes may be made without departing from the spirit and scope of the disclosure. Thus, the detailed description herein is presented for purposes of illustration only and not of limitation.

For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

For example, in the context of the present disclosure, methods, systems, and articles may find particular use in connection with gas turbine engines. However, various aspects of the disclosed embodiments may be adapted for optimized performance in a variety of engines or other applications. As such, numerous applications of the present disclosure may be realized.

Figure 1:
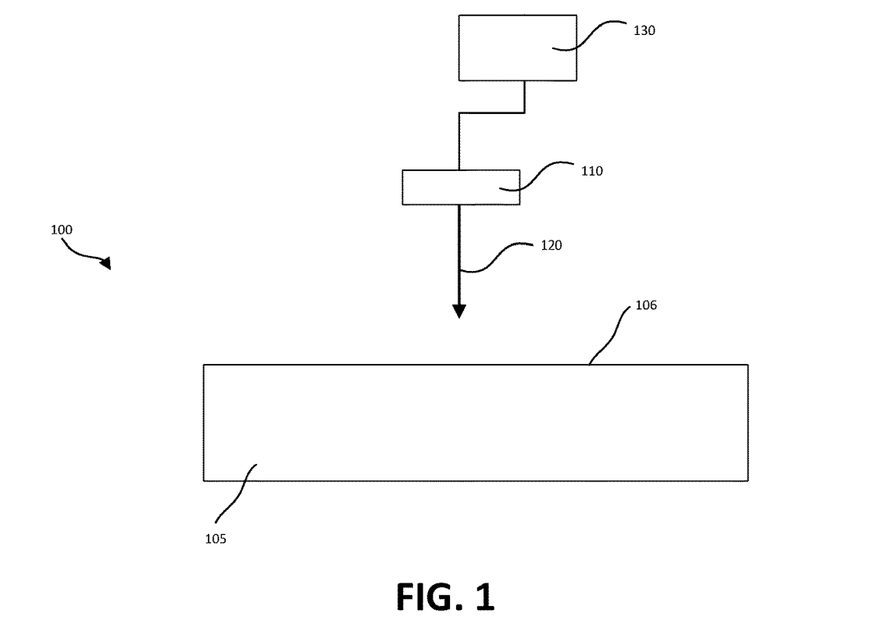
FIG. 1 illustrates a system of laser treating a substrate, in accordance with various embodiments.

Referring to FIG. 1, in accordance with various embodiments, a system of laser surface treatment of a substrate 100 is depicted comprising a substrate 105, a laser 110, and a laser beam 120. The substrate 105 may comprise a metal, metal alloy, or any other suitable material. The substrate 105 may be a stainless steel alloy comprising, by weight, a maximum of 0.08 percent carbon, 2 percent manganese, 0.04 percent phosphorous, 0.03 percent sulfur, 1 percent silicon, 17-19 percent chromium, 9-12 percent nickel, 0.1% nitrogen, and a remainder of iron wherein such stainless steel alloy is commonly known by American Society for Testing and Materials (ASTM), as ASTM A240, ASTM A276, ASTM A320, and ASTM A479 and hereinafter referred to as "ASTM A240".

In various embodiments, the substrate 105 may be an nickel alloy comprising, by weight, a minimum of 58 percent nickel, between 20-23 percent chromium, between 8-10 percent molybdenum, between 3.15-4.15 percent niobium+tantalum, 5 percent iron, 0.4 percent titanium, 0.1 percent carbon, 0.5 percent manganese, 0.5 percent silicon, 0.015 percent sulfur, 0.01 percent phosphorous, 0.45 percent aluminum, and 1 percent cobalt, commonly known by the industry standard designation of ASTM B443, ASTM B444, ASTM B704, and ASTM B446 and hereinafter referred to as "ASTM B443."

In various embodiments, the substrate 105 may be an nickel alloy comprising, by weight, a 50-55 percent nickel, 0.08 percent carbon, 0.35 percent manganese, 0.015 percent phosphorous, 0.015 percent sulfur, 0.35 percent silicon, between 17-21 percent chromium, 2.8-3.3 percent molybdenum, between 4.75-5.5 percent niobium, 0.05 percent tantalum, between 0.65-1.15 percent titanium, between 0.2-0.8 percent aluminum, 1 percent cobalt, 0.006 percent boron, 0.30 percent copper, and the remainder being iron, commonly known by the industry standard designation of ASTM B670, or ASTM B637, and hereinafter referred to as "ASTM B670." The substrate 105 may comprise any other metal or metal alloy.

A substrate contact surface 106 of the substrate 105 may be treated in preparation for adhesive bonding or coupling to a second substrate. Steel alloys and nickel alloys may be surface treated directly with a laser beam 120 that is transmitted from a laser 110 and directed toward the substrate contact surface 106 of the substrate 105. In various embodiments, the laser 110 may comprise an Nd: YAG Laser. An Nd: YAG laser is optically pumped using a flashtube or laser diodes. In various embodiments, the laser 110 may comprise a $CO_2$ laser source, an excimer laser source, a high power diode laser source, a Ti:Sapphire laser source. In various embodiments, the laser 110 may be operated in a pulsed mode having a wavelength, $\lambda$, of between 150 nm and 12,000 nm. In various embodiments, the laser may be operated in a pulsed mode having a wavelength, $\lambda$, of between 350 nm and 1100 nm. Any laser operation mode in the art may also be utilized, such as a continuous wave mode, or any other mode known in the art. In various embodiments, the laser beam 120 shape and size are not critical to the process and can be any available combination, for representative purposes, it may be round and about 10 to 100 μm in diameter. In various embodiments, the single-pulse energy fluence may range from 1 $mJ/mm^2$ and 1025 $mJ/mm^2$. In various embodiments, the laser power may be between 0.1 W to 100 W. In various embodiments, the laser power may be between 1 W and 30 W. In various embodiments, the laser power may be between 2 W and 20 W. In various embodiments, the laser speed, defined as the linear speed of the laser as it travels along a predetermined path, may be between 2.54 cm/s and 254 cm/s. In various embodiments, the laser speeds may be between 12.5 cm/s and 190 cm/s. In various embodiments, the laser speed may be between 30 cm/s and 127 cm/s. A pulse width of the laser may vary between 1 μs and 10 femtoseconds.

By varying the laser speed and the laser power, a desired topography on substrate contact surface 106 may be achieved. If the laser power is too high, the oxide formation and open-pore structures may be different, and an undesirable topography, such as solid oxide layer rather than open-pore structure or lack of oxide layer may be produced. If the laser power is too low, then the laser beam 120 may not be strong enough to interact with metal surface to form the desirable oxide layer and generate open-pore topography of the substrate. Similarly, if the speed of the laser beam 120 is too low, an undesirable topography is achieved because of overheat locally. Overheat can cause melting of a metal substrate beyond surface level. If the speed of the laser beam 120 is too fast, an undesirable topography is achieved because insufficient energy cannot produce open-pore oxide structure. By treating the substrate contact surface 106 with a laser 110, a pre-bond surface with highly increased surface area and high degree of open-pore oxide layer is formed on the substrate contact surface 106. In various embodiments, substrate contact surface 106 may be flat, curved, rounded, concave, and/or convex.

In various embodiments, the laser 110 may be coupled to a computer 130. Computer 130 may be programmed to control the position and speed of laser 110. Although shown as controlling the laser, in various embodiments, a computer may be coupled a robot/servomotor that is coupled to the substrate and programmed to control the position of the substrate while the laser 110 remains stationary. In various embodiments, the laser may be moved manually during operation. In various embodiments, the substrate may be moved manually during operation.

Figure 2A:
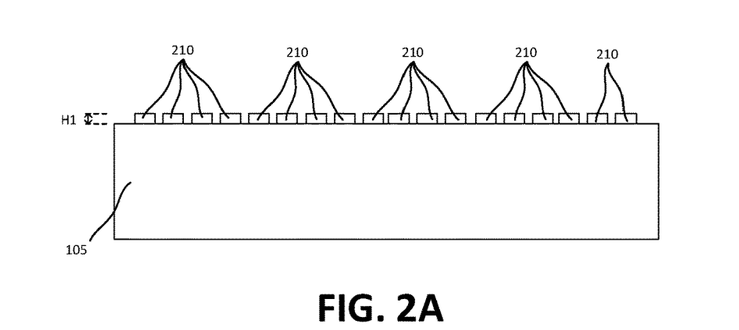
FIGS. 2A and 2B illustrate a front view and a top view of a substrate after laser treating, in accordance with various embodiments.
Figure 2B:
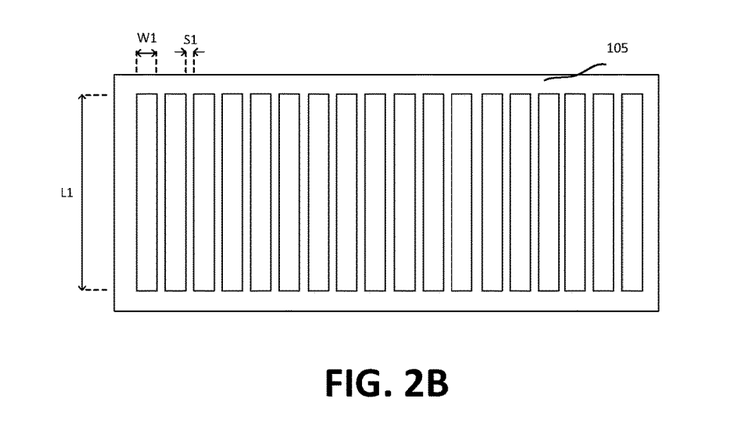

Referring now to FIGS. 2A and 2B, a side view and a top view of topography comprising a linear array topography is depicted. The topography may be the arrangement of features of the substrate contact surface 106 after laser surface treatment, in accordance with the system of FIG. 1. In various embodiments, the topography may comprise a perpendicular crosshatch pattern (FIGS. 3A and 3B), a rotating linear array (FIGS. 4A and 4B), or any other pattern commonly known in the art. In various embodiments, linear arrays 210 may have a height H1, a width W1, a length L1, and a spacing S1. Spacing may be determined by a laser beam shape and size. In many cases, the spacing is such that the lines overlap so that the entire surface area is treated. In various embodiments, the spacing S1 may be about 12.7-50 μm. In various embodiments, the width W1 may be less than 25 μm, the open pore distance D4 (see FIGS. 5A and 5B) may be between 0.05 and 1 μm, oxide layer, T4, may be 0.01 and 0.3 μm. In various embodiments, the height H1 may be 0.1 to 1 μm. In various embodiments, the length L1 may be about the length, or slightly less than the length, of the substrate 105. In various embodiments, the spacing S1 may be about 0 μm, ensuring the entire contact surface 106 has been treated.

Figure 3A:
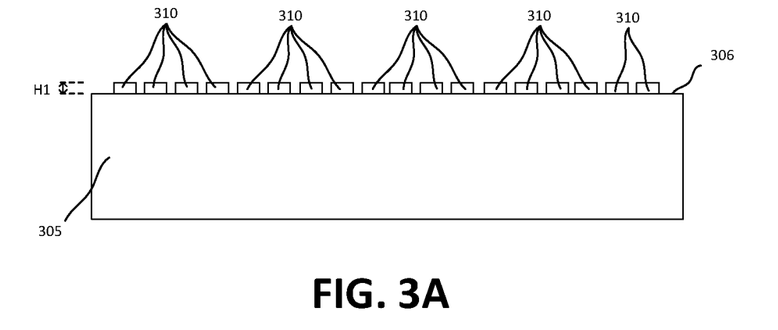
FIGS. 3A and 3B illustrate a front view and a top view of a substrate after laser treating, in accordance with various embodiments.
Figure 3B:
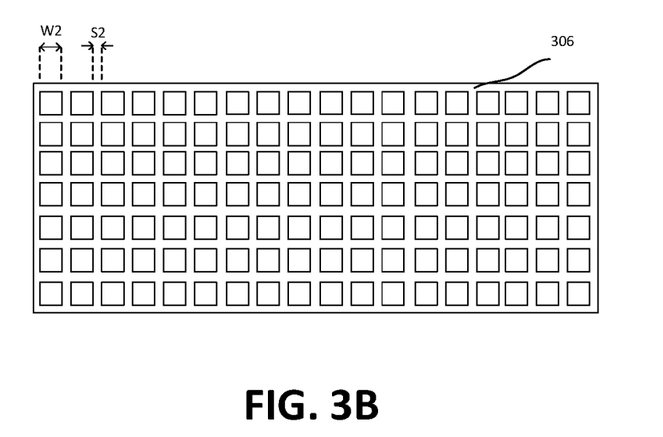

Referring now to FIGS. 3A and 3B, a side view and a top view of a topography comprising a perpendicular crosshatch pattern is depicted. In various embodiments, a substrate 305 may have a plurality of pedestals 310 having a width W2 and being spaced apart by a spacing S2. In various embodiments, the spacing S2 may be about 25-50 μm. In various embodiments, the height H2 may be about 0.1 to 1 μm. In various embodiments, substrate contact surface 306 may be flat, curved, rounded, concave, and/or convex. In various embodiments, the width W2 may be less than 25 μm. In various embodiments, the width W2 may be less than 5 μm. In various embodiments, the spacing S2 may be about 0, ensuring the entire contact surface 306 has been treated.

Figure 4A:
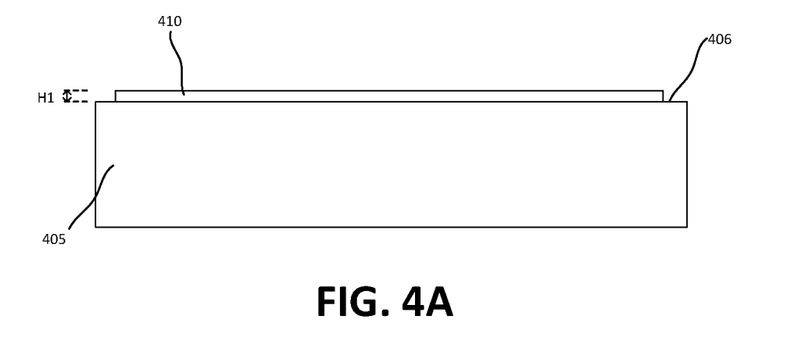
FIGS. 4A and 4B illustrate a front view and a top view of a substrate after laser treating, in accordance with various embodiments.
Figure 4B:
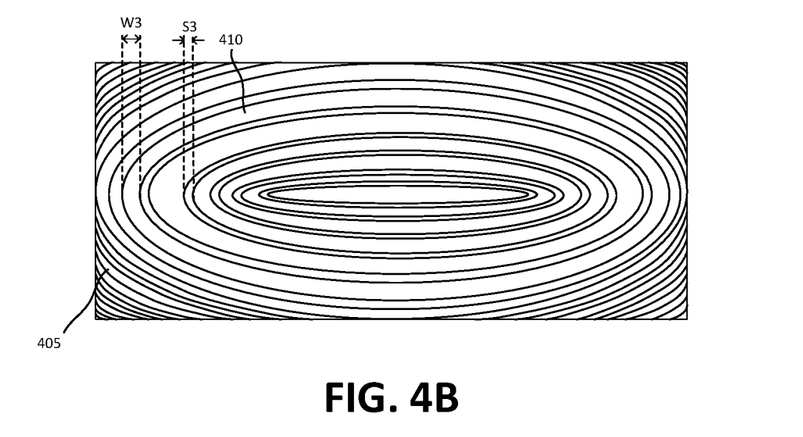

Referring now to FIGS. 4A and 4B, a side view and a top view of a topography comprising a rotating linear array is depicted. In various embodiments, a substrate 405 may have a plurality of rotating linear arrays 410 having a width W3 and being spaced apart by a spacing S3. In various embodiments, the spacing S3 may be about 25-50 μm. In various embodiments, the height H3 may be about 0.1 to 1 μm. In various embodiments, substrate contact surface 406 may be flat, curved, rounded, concave, and/or convex. In various embodiments, the width W3 may be less than 25 μm. In various embodiments, the width W3 may be less than 5 μm. In various embodiments, the spacing S3 may be about 0 μm, ensuring the entire contact surface 406 has been treated.

Figures 5A, 5B:
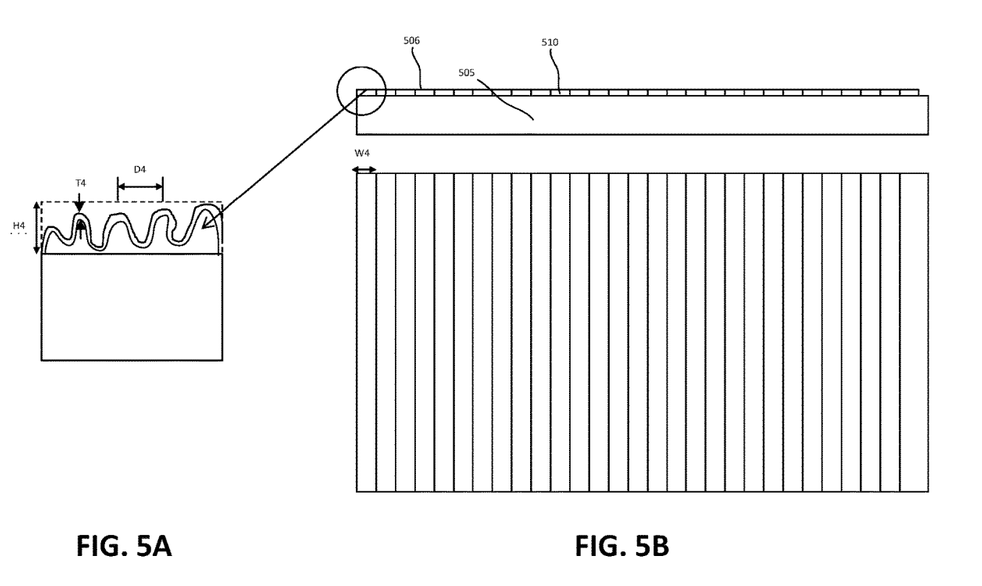
FIGS. 5A and 5B illustrate a front view and a top view of a substrate after laser treating, in accordance with various embodiments.

Referring now to FIGS. 5A and 5B, a side view and a top view of a topography comprising an overlapping linear array is depicted. In various embodiments, a substrate 505 may have a plurality of overlapping linear arrays 510 having a width W4. In various embodiments, the height H4 may be between 0.1 to 1 μm. In various embodiments, substrate contact surface 506 may be flat, curved, rounded, concave, and/or convex. In various embodiments, the width W4 may be less than 25 μm. In various embodiments, the width W4 may be less than 5 μm. In various embodiments, within each array there may be multiple peaks being spaced by a distance D4. In various embodiments, D4 may be less than 10 μm. In various embodiments, the distance D4 may be less than 5 μm. In various embodiments, each array 510 may have a thickness T4. The thickness T4 may be between 0.1 to 1 μm.

Laser surface treatment, as described above, may provide excellent adhesive bond performance on stainless steel and/or nickel alloy surfaces. In various embodiments, adhesive bond performance of stainless steel and nickel alloys, after laser surface treatment, may show significant improvement in crack resistance. Laser surface treatment may also provide 100% cohesive failure mode of a substrate, resulting in desirable bond characteristics.

In various embodiments, laser treated stainless steel alloys and nickel alloys may exhibit oxide layers formed at a macro-roughness and a micro-roughness. In various embodiments, the entire contact surface of a substrate may be treated. The oxide layers may form in the spacing (S1, S2, S3, S4), as depicted in FIGS. 2A, 2B, 3A, 3B, 4A, 4B, 5A and 5B. This may allow a nano-scale porous oxide layer to form on the substrate contact surface 106 and allow strong chemical interaction and additional mechanical interlocking to enhance adhesive bonding. In various embodiments, a primer, or adhesive may fully infiltrate into the porous oxide layers. An additional benefit of laser surface treatment may be the removal of surface contaminants during the ablation process.

Figure 6:
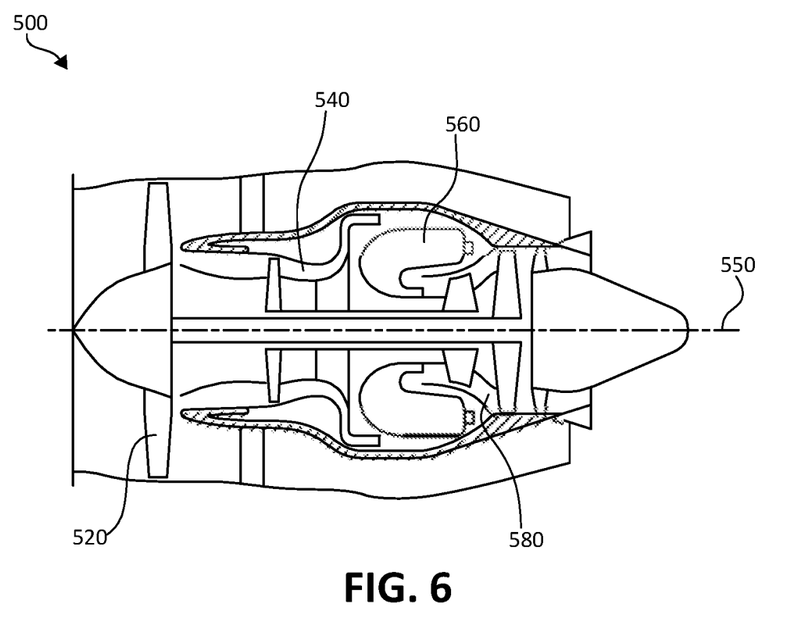
FIG. 6 illustrates a cross-sectional view of a gas turbine engine in accordance with various embodiments.

In various embodiments, this disclosure may be applied to a gas turbine engine in an aircraft, and specifically, in a fan blade, or other rotor blade, of a gas turbine engine. Referring to FIG. 6, a gas turbine engine 500 is illustrated according to various embodiments. The gas turbine engine 500 may generally comprise, in serial flow communication, a fan 520 through which ambient air is propelled, a compressor section 540 for pressurizing the air, a combustor 560 in which the compressed air is mixed with fuel and ignited for generating an annular stream of hot combustion gases, and a turbine section 580 for extracting energy from the combustion gases. Axis of rotation 550 may define the forward-aft position of the gas turbine engine 500. For example, the fan 520 may be referred to as forward of the turbine section 580 and the turbine section 580 may be referred to as aft of the fan 520. As air flows from the fan 520 to the more aft components of the gas turbine engine 500, the axis of rotation 550 may also generally define the direction of the air stream flow.

Figure 7:
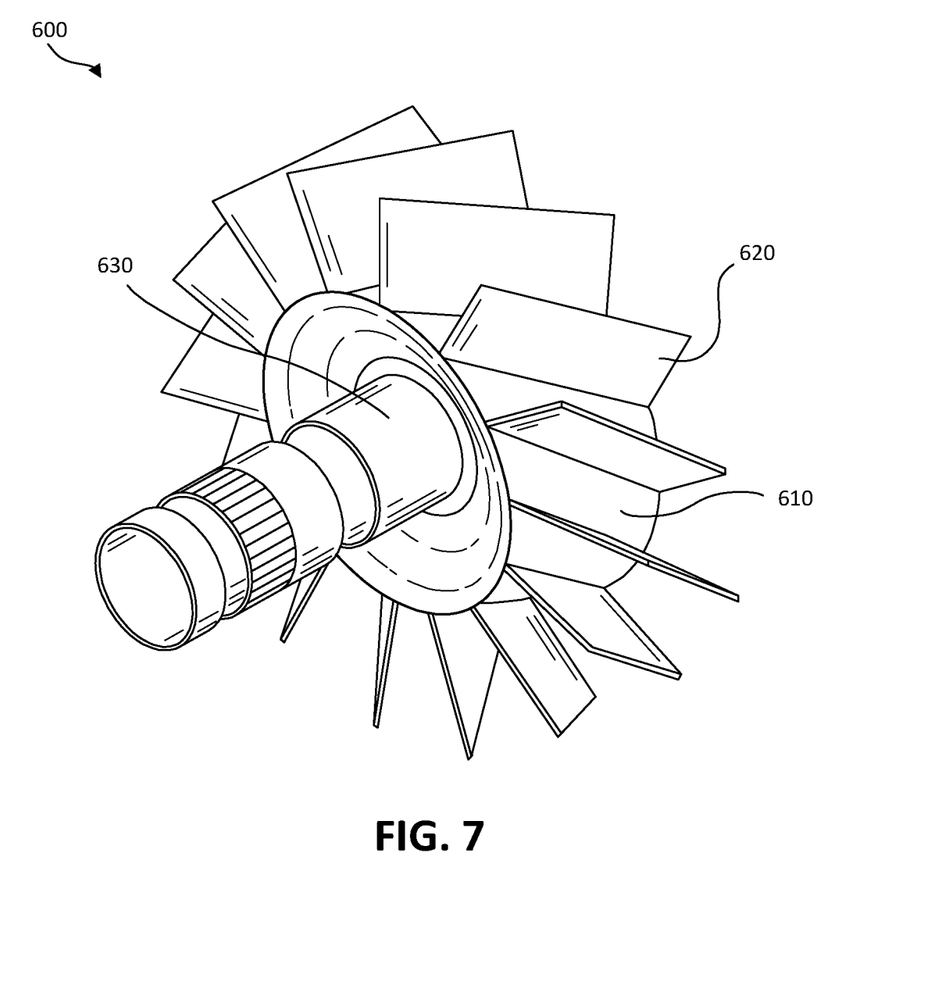
FIG. 7 illustrates a perspective view of a rotor which may be used in a gas turbine engine in accordance with various embodiments.
Figure 8:
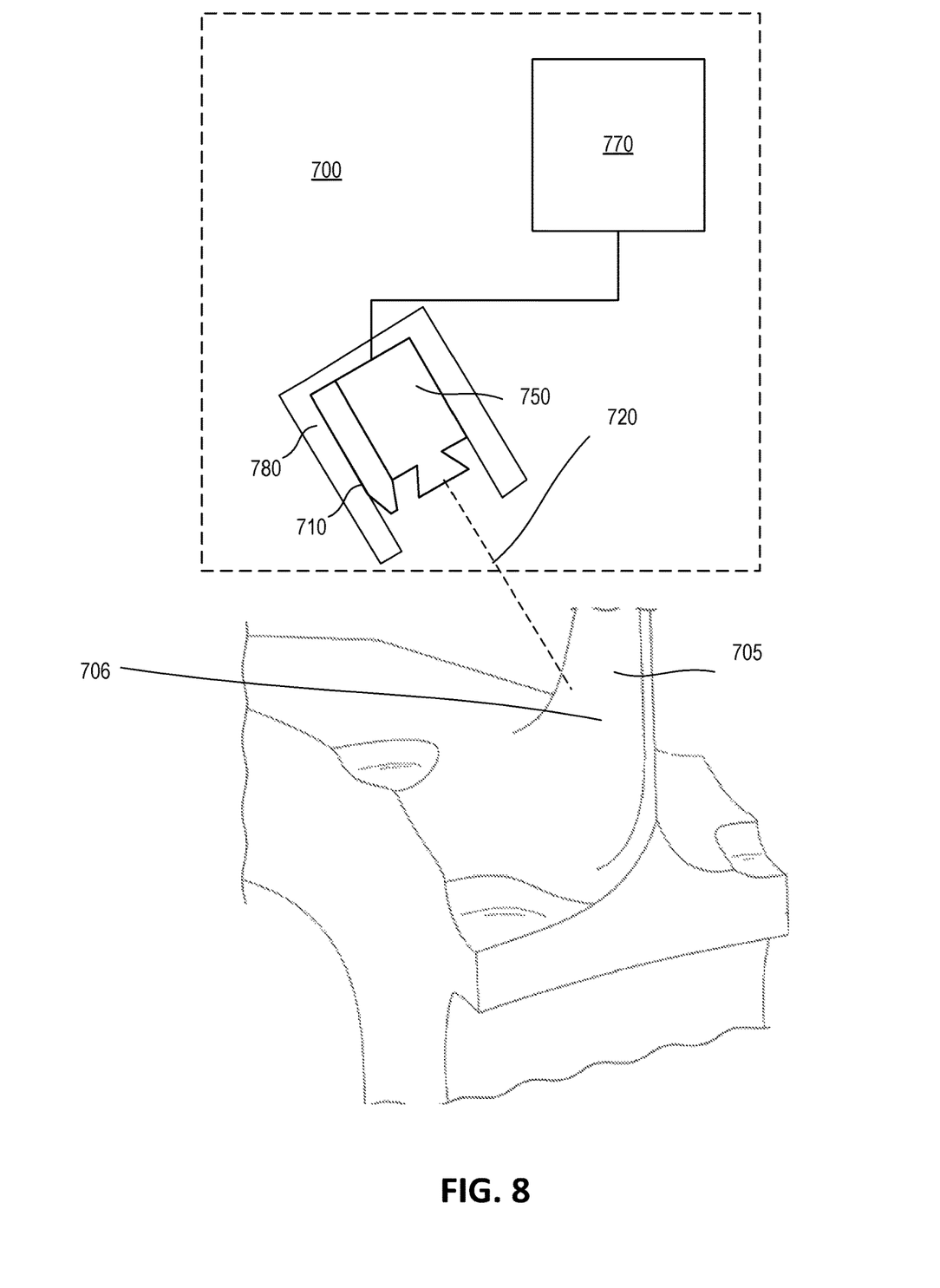
FIG. 8 illustrates a system for laser treating a blade, in accordance with various embodiments.

Referring to FIGS. 7 and 8, in accordance with various embodiments, a rotor 600 which may be used in the gas turbine engine 500 of FIG. 6, or in any other adequate type of gas turbine engine, is illustrated. In the illustrated embodiment, the rotor 600 is a first stage of a high pressure compressor of the compressor section 540. However, it is understood that the rotor can be any other rotor of the gas turbine engine 500, including a turbine rotor. The rotor 600 may comprise a rotor disk 610 which supports a circumferential array of regularly spaced blades 620. The rotor disk 610 and the blades 620 may be, but are not necessarily, integrally molded, ie., form a monolithic structure. The rotor disk 610 may include a hub 630 for engaging a central shaft.

Referring to FIG. 8, in accordance with various embodiments, a system 700 of laser surface treatment of a blade is depicted. The laser surface treatment system may comprise a computer numeric control (CNC) tool 750, a laser 710, and a computer 770. The laser 710 and the CNC tool 750 may be electrically connected to the computer. In various embodiments, the system may be used to laser surface treat a blade 700. In FIG. 7, a portion of a cross-section of an airfoil 705 is depicted. Although an airfoil 705 is depicted for illustrative purposes, it should be understood that any portion of a rotor blade may incorporate this disclosure, including turbine and/or compressor rotor blades, as well as, any curved surface that may need laser surface treatment. The airfoil 705 may comprise a contact surface 706. In various embodiments, the airfoil 705 or airfoil attachment may be comprised of a nickel alloy, for example, ASTM B443 or ASTM B670. In various embodiments, the airfoil 705 may be comprised of a stainless steel alloy, for example, ASTM A240.

A pulsed laser beam 720 may be directed at contact surface 706. The pulsed laser beam 720 may ablate portions of blade or blade attachments contact surface as described in the description when discussing FIG. 1. The pulsed laser beam 720 may be released from laser 710, which may comprise any laser described herein in the description of the laser 110 for FIG. 1.

In various embodiments, a laser 710 may be coupled to and/or coaxial with a CNC tool 750. The CNC tool may be coupled to a computer 770. Thus, in response to CNC tool being programmed to center on a specific location, such as location to be ablated, the laser 710 may be focused on the specific location. A shroud 780 may surround laser 710 and CNC tool 750. The shroud 780 may ensure that anyone operating the system 700 may be protected from the pulsed laser beam 720.

The contact surface 706 may comprise a complex three-dimensional surface, such as a convex surface, a concave surface, a curved surface, or the like. In various embodiments, the contact surface 706 may comprise a pressure side of an airfoil. In various embodiments, the blade contact surface 706 may comprise a suction side of an airfoil. In various embodiments, the blade contact surface may comprise a leading edge of an airfoil. In various embodiments, the computer may be programmed to ensure that the laser 710 remains substantially normal to the contact surface 706 during operation. In various embodiments, substantially means plus or minus 10° in relation to the contact surface 706. The computer may be programmed with a predefined geometric pattern for the contact surface 706. In various embodiments, the predefined geometric pattern may comprise a linear array pattern (as shown in FIGS. 2A and 2B), a perpendicular crosshatch pattern (as shown in FIGS. 3A and 3B), a rotating linear array (as shown in FIGS. 4A and 4B), a full surface linear array (FIGS. 5A and 5B) or any other pattern commonly known in the art. In various embodiments, the predefined geometric pattern may be applied to a portion of the contact surface 706. The portion of the contact surface 706 may be a portion that may be adhesively bonded to a second component. In various embodiments, the topography of the contact surface 706 may be configured to be adhesively bonded to a second component. Examples of the second components including leading edge sheath, tip cap and other adhesively bonded attachments. The topography of contact surface 706 may also be also configured for other pre-bond surfaces of adhesively bonded structures used in structural guide vane, fan inlet case, imbedded bushing support and dissimilar material co-molding parts.

Figure 9:
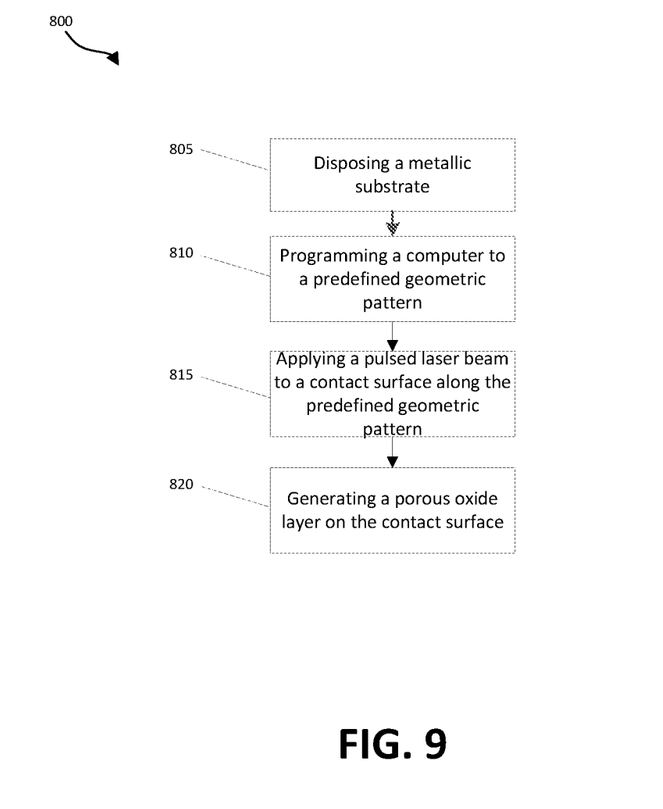
FIG. 9 illustrates a block diagram depicting a method for laser treating a substrate, in accordance with various embodiments.

FIG. 9 illustrates a block diagram depicting a method 800 of laser surface treatment on stainless steel and nickel alloys, in accordance with various embodiments. With combined reference to FIG. 1, laser treating a substrate 105 may comprise disposing a metallic substrate under a laser 110 (step 805). In various embodiments, the substrate 105 may be disposed under a system comprising a CNC tool coupled to a laser, as depicted in FIG. 8. In various embodiments, the CNC tool may be coupled to a computer. The metallic substrate may comprise of a nickel alloy or a stainless steel alloy.

In various embodiments, a computer may be programmed to define a path for the laser to travel (step 810). The path may correspond to a predefined geometric pattern corresponding to a desired topography of the contact surface. For example, the predefined geometric pattern may comprise a linear array pattern, a perpendicular crosshatch pattern, a rotating linear array, or any other pattern commonly known in the art. In various embodiments, the predefined pattern may be defined on a flat surface or a complex three-dimensional surface.

In various embodiments, a program may be run on the computer that applies a pulsed laser beam to a contact surface along the predefined geometric pattern (step 815). The pulsed laser beam may be directed normal to the contact surface. In various embodiments, the operation may generate a highly open-pore oxide layer on the contact surface (step 820). The highly porous oxide layer may comprise a topography corresponding to the predefined geometric pattern.

Figure 10:
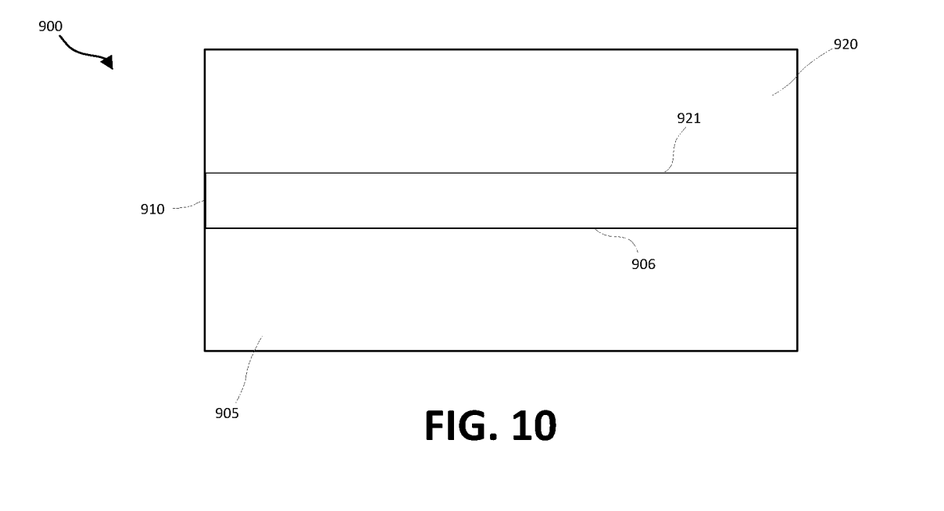
FIG. 10 illustrates a system for adhesively bonding a first substrate to a second substrate, in accordance with various embodiments.

Referring to FIG. 10, in accordance with various embodiments, a system of bonded substrates 900 is depicted comprising a first substrate 905, an adhesive 910, and a second substrate 920. A first substrate contact surface 906 of the first substrate 905 may be treated in preparation for bonding or coupling with the adhesive 910 by a laser surface treatment, in accordance with various embodiments in this disclosure. Similarly, the second substrate contact surface 921 of the second substrate 920 may be laser treated in a similar manner as the first substrate contact surface 906. By treating the first substrate contact surface 906 and second substrate contact surface 921 with a laser, a highly open-pore oxide layer is formed on the first substrate contact surface 906 and the second substrate contact surface 921.

An adhesive 910 may be disposed on the first substrate 905 and may comprise at least one nonmetallic material. The adhesive 910 may be configured to bond two dissimilar, or similar, substrates or materials, the first substrate 905 and the second substrate 920, and prevent galvanic corrosion from occurring between the first substrate 905 and the second substrate 920 by providing an isolation layer. As used herein, the term "isolating," "isolation," or the like, may refer to electrically insulating or electrical insulation, and/or completely or substantially blocking electrical conductivity and electrochemical communication between two or more materials and/or substrates. The adhesive material 910 may be coupled to the first substrate 905 and second substrate 920 after surface treatment of the first substrate contact surface 906, and the second substrate contact surface 921. The adhesive material 910 may comprise, for example, one or more epoxies, bismalemides, cyanate esters, or polyimides, and may be a supported or unsupported film and/or paste. A supported adhesive material may comprise a support comprised of nylon, polyester, fiberglass, or glass, which may be woven or non-woven.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Methods and systems for the bonding of dissimilar substrates are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for manufacturing an airfoil, the method comprising:
    disposing an airfoil under a system comprising a computer numerical control (CNC) tool coupled to a laser;
    programming one or more processors with a predetermined set laser path corresponding to a predefined geometric pattern for the laser along the airfoil to form a program;
    commanding, by the one or more processors and in response to execution of the program, a laser to apply a pulsed laser beam to a contact surface of the airfoil along the predefined geometric pattern, the pulsed laser beam having a single pulse fluence between 1 mJ/mm$^2$ and 1025 mJ/mm$^2$, wherein the airfoil comprises at least one of nickel or steel;
    in response to the commanding the laser along the predefined geometric pattern, forming a topography on the contact surface having a height between 0.1 µm and 1 µm, an open pore structure with a pore distance between 0.05 and 1 µm, and an oxide layer between 0.01 and 0.3 µm, wherein:
        the contact surface is at least one of a pressure side and a suction side of the airfoil,
        maintaining the pulsed laser beam substantially normal to the contact surface during operation, and
        the predetermined set laser path is a three-dimensional path corresponding to the predefined geometric pattern of the contact surface, wherein the contact surface has a complex three-dimensional surface, and
    disposing an adhesive on the contact surface; and
    bonding a second substrate to the contact surface of the airfoil.

2. The method of claim 1, further comprising prior to the commanding, by the processor, coupling the laser to a computer numeric control (CNC) tool.

3. The method of claim 1, wherein the single pulse fluence is between 10 mJ/mm2 and 205 mJ/mm2.

4. The method of claim 1, wherein the predefined geometric pattern comprises at least one of a perpendicular crosshatch pattern or a rotating linear array.

5. The method of claim 1, wherein the pulsed laser beam comprises a wavelength of about 355 nm or about 1,064 nm.

6. The method of claim 1, wherein the second substrate has a dissimilar material relative to the airfoil.

* * * * *